Figure 1:
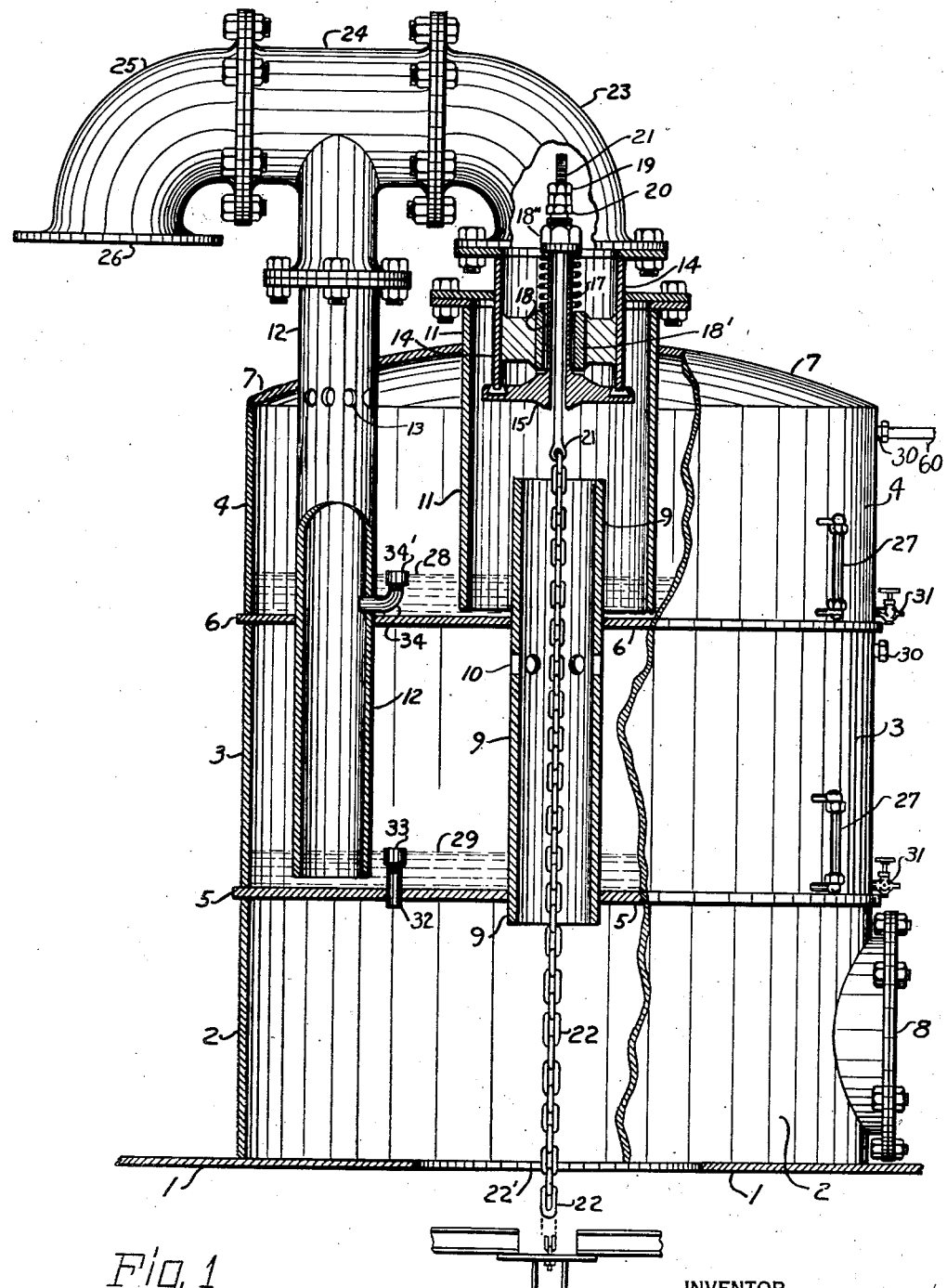

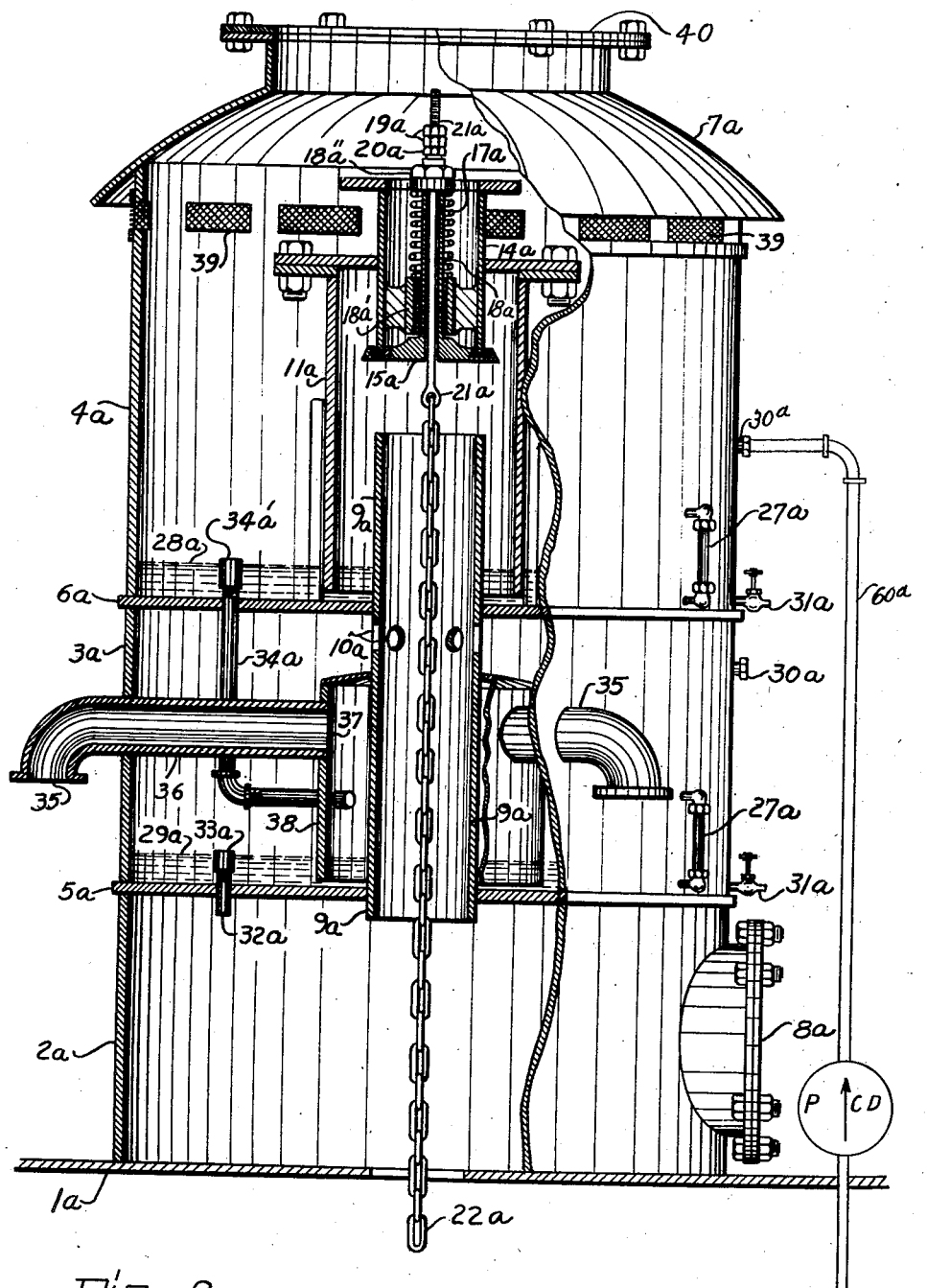

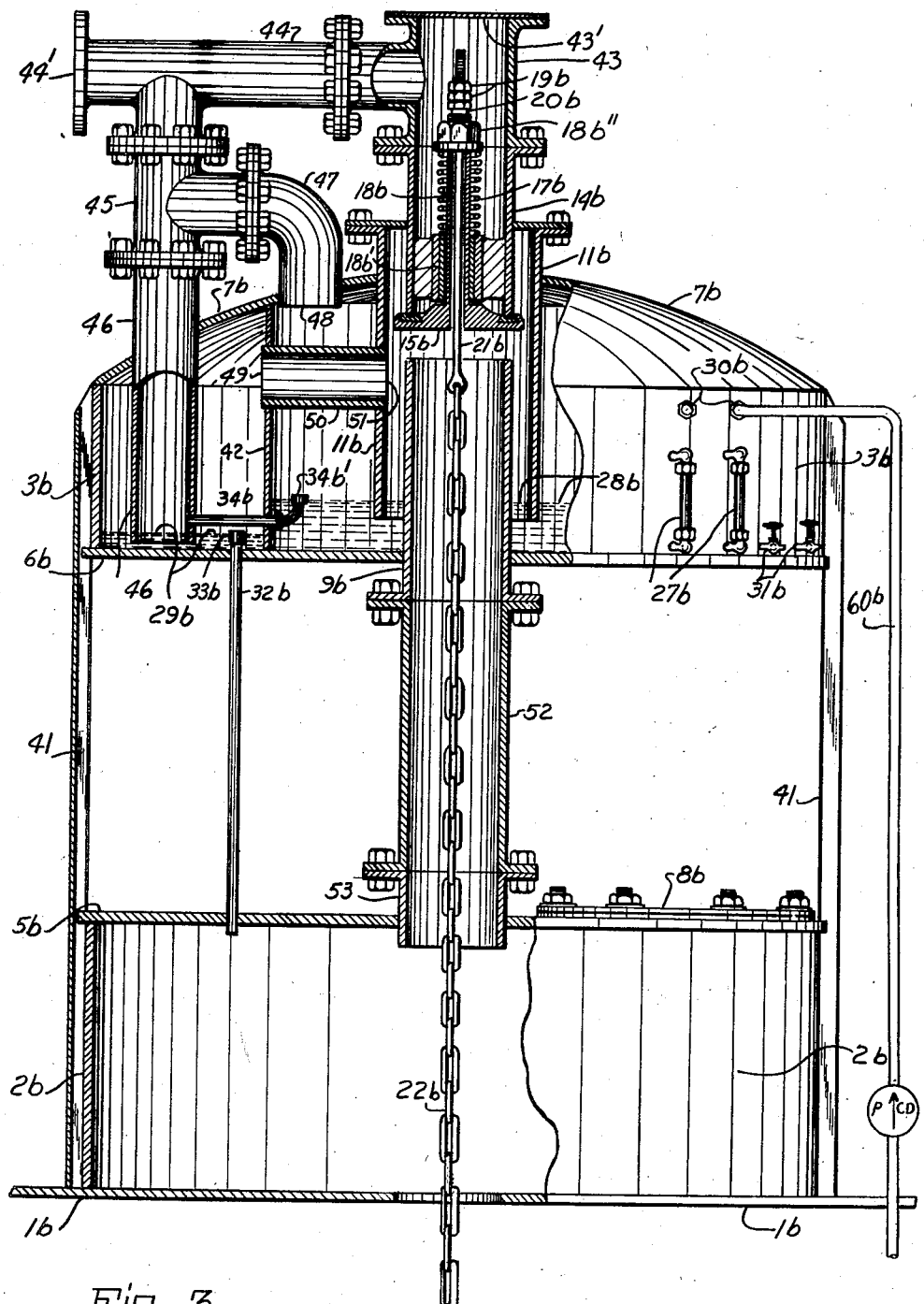

Patented Feb. 20, 1945

2,370,040

UNITED STATES PATENT OFFICE 2,370,040

SAFETY VALVE FOR STORAGE TANK ROOFS

James O. Jackson, Crafton, Pa., assignor to Pittsburgh-Des Moines Company, Pittsburgh, Pa., a corporation of Pennsylvania Application January 16, 1942, Serial No. 427,070

13 Claims. (Cl. 220—85)

This invention relates to safety valves for storage tank roofs, particularly roofs which expand and contract to accommodate a variable vapor volume.

Large storage tanks, such as are commonly used to store gasoline, crude oil and other volatile liquids, are sometimes built with flexible roofs designed to expand and contract in order to conserve the vapor generated by the stored liquid. In the common forms of tanks such roofs are not capable of withstanding much pressure or vacuum, the maximum safe pressure for ordinary roofs being equal only to several inches of water, seldom more than 7 or 8 inches, the maximum vacuum being considerably less, usually only 1 or 2 inches. With such extremely small pressures it is quite difficult to build a valve operating mechanically which has sufficient sensitivity to open and close with such minute pressure changes. Any slight imperfection in the manufacture or operation of the valve, such as sticking at the valve seat or in the guides, would very materially change the pressure at which the valves would open or close.

Proper venting of vapor conserving roofs is extremely important as the roof or the tank might easily be damaged by excessive pressure or vacuum or by excessive movement of the roof. If the size of the roof is properly proportioned to suit the temperature conditions the tank contents should be vented only at very infrequent intervals. When such venting is necessary, however, because of seasonal or other causes it is extremely important that the venting valve be thoroughly reliable. Due to the variations in the friction of the moving parts and the effect of adhesion on the valve seat and the resultant operating troubles mechanical valves frequently prove unsatisfactory.

It is the object of my invention to provide a valve which will operate with certainty within the range of pressure changes required by vapor conserving tank roofs and which will not be affected by mechanical imperfections, or cold weather, and which definitely obviates any possibility of damage to the tank or roof due to excessive pressure or vacuum.

It is a further object of my invention to provide a valve which is absolutely reliable and will operate on extremely low differences of pressure and with practically no variation in operating characteristics.

Other advantages in my valve construction will be apparent from the detailed description thereof.

In the accompanying drawings, showing for purposes of exemplification but without limiting my invention or claims thereto, certain preferred embodiments of my invention:

Fig. 1 is a side elevation, partly sectioned, showing one form of my invention; Fig. 2 is a similar view showing a second form and Fig. 3 is a similar view showing a third form.

Referring to Fig. 1, the tank roof is shown at 1 to which, by suitable means as by welding, the lower cylindrical element 2 of the valve shell is attached. The middle cylindrical element is shown at 3 and the top cylindrical element at 4. Partition sheets 5 and 6 separate the elements 2 and 3, and 3 and 4 respectively, and are attached to them by some suitable means as by welding. The top cover 7, preferably dome shape, is attached to the top element 4 as by welding. A manhole 8 permits access to the interior of the tank roof when the tank is filled. A cylindrical pipe or tube 9 passes through and is attached as by welding to partitions 5 and 6 and is provided with port holes 10 near the upper end of the middle chamber and immediately below partition 6. A larger cylindrical pipe or tube 11 extends downwardly through the top cover 7 and almost, but not quite, to partition 6 and is attached near its upper end to the top cover as by welding. A cylindrical pipe or tube 12 extends downwardly through the top cover 7 and partition 6 almost, but not quite, to partition 5 and is attached to the top cover and partition 6 as by welding. The pipe or tube 12 is provided with port holes 13 communicating with the upper section of the valve shell immediately below the top cover 7. To a flange on the upper end of tube 11 is connected in a gas-tight manner, as by bolting, an annular plate carrying and sealed about valve body 14 which is closed by valve 15 with suitable packing, which is kept tightly shut by spring 17. Valve 15 is rigidly, preferably integrally, attached to tubular valve stem 18 which has at its upper end packing nut 20. The stem 18 is guided in tubular member 18' suitably attached as by arms to the valve body 14, as shown. Nut 18'' screwthreaded to the upper end of valve stem 18 serves to restrict the spring 17 at its upper end while the tubular member 18' restricts it at its lower end. Adjustable link 21 passes through the tubular valve stem 18 and is made tight to the valve stem by packing nut 20 which seals the valve stem at its upper end. Stop nuts 19 are provided for link 21 so that the said link and the chain 22 may be adjusted conveniently. Chain 22 passes freely through an opening 22' in the tank roof and is attached to some rigid part of the interior tank framing such as the roof framing shown. Attached to valve body 14 is elbow 23 to which in turn is attached the pipe T 24 which in turn is attached to the upper end of tube 12, all in a gas-tight manner as by bolting together their terminal flanges as shown. Elbow 25 is attached to pipe T 24 and terminates in flange 26. A glass gauge 27 indicates the level of sealing liquid 28 in the upper compartment and 29 in the lower compartment. Plugged openings 30 permit sealing liquid to be introduced to the two chambers. Pet cocks 31 are provided for draining the sealing liquid when necessary. A small pipe 32 passes through partition 5 and is attached to it as by welding and is provided with an adjustable collar 33 at its upper end. A tube 34 in the form of an elbow is attached tightly to tube 12 as by welding and is provided with an adjustable collar 34' at its upper end.

Fig. 1 operates as follows: Gases from the tank interior pass through tank roof 1, tube 9 at its top and port holes 10 and are thus impressed upon sealing liquid 29 in the middle chamber and 28 in the upper chamber. The adjustable collar 33 is set at the number of inches of pressure or vacuum of the sealing liquid at which it is desired to have the tank vent. If an excessive vacuum is present in the tank interior, air from the atmosphere will enter at 26 and pass down tube 12 where it will bubble up through sealing liquid 29 entering ports 10 and be communicated to the tank interior where such excessive vacuum will be relieved. Outside air will also enter ports 13 and will raise the level of the sealing liquid in the inside of tube 11 until the difference in elevation inside and outside the tube reaches a balance with the difference between the absolute pressures inside and outside of the tank.

If an excessive pressure exists in the tank interior it will be communicated through tube 9 to the interior of tube 11 where it will bubble out entering chamber 4 and ports 13 and be relieved to the outside air. Excessive pressure will likewise enter the middle compartment through ports 10 and will be impressed upon the surface of sealing liquid 29 which will cause the level of the sealing liquid to rise in tube 12 until an equilibrium is reached.

Any vapors which might condense in the upper compartment will raise the level of sealing liquid 28 causing it to overflow into the middle compartment through 34 and tube 12 which will likewise raise the level of the sealing liquid 29 in the middle compartment causing such excess liquid to overflow through tube 32 back into the tank.

Another feature of my invention is that a very small amount of tank contents may be introduced through the upper filling connection 30 which will continually overflow through 34 and 32 and thus automatically maintain the proper liquid levels in spite of the effects of evaporation and condensation. This may be conveniently accomplished in a conventional manner by providing a tube and constant-delivery pump connection between the filling connections 30, 30a and 30b, with plug removed, and the tank, at a point below the surface of the liquid in the latter, as diagrammatically indicated at 60a and 60b in Figs. 2 and 3, respectively, and by the broken-away tube 60 in Fig. 1.

It is therefore apparent that my invention provides a valve which is extremely dependable for relieving a storage tank of excessive pressure or vacuum and one which will function under all conditions of temperature ordinarily experienced.

I have found that no one liquid is suitable for a sealing liquid for all types of materials being stored. Commercial kerosene is perhaps the most useful sealing liquid because it remains very fluid even at extremely low temperatures and is widely available. In some installations, particularly where it is desired to automatically drain off any vapor condensate, salt water is suitable as a sealing liquid for the hydro-carbons which condense from the vapors, are lighter in gravity than the salt water and, therefore, float on the top where they are drawn off by the overflow pipe. Frequently the material being stored in the tank makes a suitable liquid seal and in this case a small amount of the material being stored may be continuously pumped into the upper chamber where it will circulate through the valve maintaining it in proper level and working condition.

Valve 15 is provided as a further safety. When the tank roof has reached the safe limit of its upward travel valve 15 is automatically opened by the pull of chain 22 which is attached to a rigid structural member on the interior of the tank. This vents the tank completely to atmosphere but when the excess pressure is removed and the roof travels a sufficient distance downward valve 15 automatically closes because of the action of spring 17 when the valve is again automatically placed in operation.

Fig. 2 shows another form of my invention in which the tubes are maintained along the central axis of the valve so that if it is tipped during operation of the roof the relative levels are not as materially changed as would be the case with Fig. 1. In Fig. 2 parts similar to those in Fig. 1 are given identical numbers followed by the letter "a". 36 are tubes communicating with the interior of covered cylindrical tube 38 through openings 37. This tube terminates in flanges 35 for external connections. 39 are ports in the upper chamber 4a communicating to the outside air and covered with screens to prevent the passage of flame from the outside to the inside of the valve. A removable cover 40 is attached as by bolting to top cover 7a for adjustment of link 21a.

Fig. 2 operates as follows: An excessive vacuum causes air to enter at 35 pass through 36 into cylinder 38 from the bottom of which it bubbles up into chamber 3a and passes through port holes 10a and tube 9a into the tank thus relieving excessive vacuum therein. Air will also enter ports 39 causing a readjustment of the liquid levels in chamber 4a and tube 11a, until equilibrium is reached. An excessive pressure in the tank will cause the vapors to pass upwardly in tube 9a into tube 11a bubbling up from the bottom thereof into chamber 4a from which they escape through ports 39. Some of these vapors will also pass through ports 10a into chamber 3a causing readjustment of the liquid levels in chamber 3a and cylinder 38 until equilibrium is reached.

Fig. 3 shows another form of my invention having only one compartment. Parts having similar functions are given the same reference numerals as in Figs. 1 and 2 except that they are followed by the letter "b". In Fig. 3 structural steel members 41 are shown supporting the valve chamber 3b. A cylindrical interior circular partition 42 is attached as by welding to partition 6b and to top cover 7b. A special pipe T 43 is attached to valve body 14b as by bolting and provided with a cover 43' at the top which may be removed for the adjustment of link 21b. An elbow 44 is attached as by bolting to 43. A T 45 is attached to 44 as by bolting. A tube 46 extends almost, but not quite, to partition 6b and is attached as by welding to top cover 7b. An elbow 47 is attached as by bolting to 45 and extends through and is attached as by welding to cover 7b and terminates in an open end 48. A tube 50 connects pipe 11b with partition 42 made gastight as by welding, and terminates at its two ends in openings 49 and 51. A removable pipe section 52 connects tube 9b to tube 53 which is attached as by welding to plate 5b.

Fig. 3 operates as follows: An excessive vacuum causes air to enter at 44', pass through tubes 44, 45 and 46, bubble up from the bottom of tube 46, from whence it passes through tube 50, cylinder 11b and tube 52 to the tank. Air also passes through tube 47 until equilibrium is effected between the liquids in 42 and 11b. An excessive pressure in the tank causes its vapors to pass up tube 52, bubble up from the bottom of tube 11b and escape through tubes 47, 45 and 44'. Some of the vapors also pass through tube 50 until equilibrium is established between the liquids inside and outside of tube 46.

My improved venting system possesses many advantages. It is more sensitive to changes in pressure than mechanically held spring or diaphragm valves. There are no vital parts to become worn or corroded that would prevent efficient operation. It automatically corrects the set operating pressure and at the same time acts as a vapor conserving device to return condensate to the tank. Tank contents may be used as the liquid seals, or other fluids may be used as the liquid seals for obtaining special results. Neglect or lack of attention will not cause a dangerous condition because if the sealing liquid becomes too low venting pressures are reduced instead of increased.

While I have shown and described certain embodiments of my invention it is to be understood that it is capable of many modifications, that some parts may be used without concurrent use of other parts and that changes in construction and arrangement may be made therein without departing from the spirit and scope of my invention. It is my purpose to cover in the claims all the novelty in my invention over the prior art.

I claim:

1. A safety valve mechanism for closed tanks adapted for storage of volatile fluids whose internal pressure varies through a substantial range, said mechanism comprising two chambers partially filled with sealing liquid; the first of said chambers freely venting to the atmosphere and the second of said chambers being normally sealed there-against; an inverted cup-like member whose open end projects below the surface of the liquid in said first chamber and is spaced a slight distance from the bottom thereof; a conduit open at one end to the atmosphere, its other end projecting below the surface of the sealing liquid in said second chamber and spaced a slight distance from the bottom thereof; and means adapted to provide free communication between the tank and both said cup-like member and said second chamber, above the surfaces of the sealing liquid therein.

2. In the combination defined in claim 1, means for maintaining the surfaces of said liquids at predetermined levels.

3. In the combination defined in claim 1, means for maintaining the surfaces of said liquids at predetermined levels and for returning surplus liquid to the tank.

4. The combination as defined in claim 1 in which said first chamber is located above said second chamber, said means which is adapted to communicate with the tank extending upwardly from said second chamber, its upper end projecting into the cup-like member above the sealing liquid therein, its intermediate portion being provided with an opening leading into said second chamber above the sealing liquid therein.

5. The combination as defined in claim 1 in which said first chamber is located above said second chamber, said conduit extending upwardly through said first chamber and provided with an opening leading into said first chamber above the liquid therein.

6. The combination as defined in claim 1 in which said first chamber is located within said second chamber and sealed therefrom, a conduit connecting the cup-like member with said second chamber above said sealing liquids.

7. A safety valve mechanism for closed tanks adapted for storage of volatile fluids whose internal pressure varies through a substantial range, said mechanism comprising two chambers partially filled with sealing liquid; the first of said chambers freely venting to the atmosphere adjacent its upper end, and the second of said chambers being normally sealed there-against; an inverted cup-like member whose open end projects below the surface of the liquid in said first chamber and is spaced a slight distance from the bottom thereof; an inverted cup-like member whose open end projects below the surface of the sealing liquid in said second chamber and is spaced a slight distance from the bottom thereof; a conduit open at one end to the atmosphere, its other end opening into said second cup-like member; and means adapted to provide free communication between the tank and both said second chamber and said cup-like member in said first chamber, above the surfaces of the sealing liquid therein.

8. A relief valve for a tank containing volatile liquids, said valve having two compartments each partially filled with sealing liquid; a vent providing communication between the atmosphere and the interior of the first compartment above the sealing liquid; conduit means adapted to communicate with the tank and having a downwardly extending portion with an opening below the level of the sealing liquid in said first compartment; an overflow conduit for the sealing liquid in the first compartment discharging into the second compartment below the level of the sealing liquid therein; an overflow conduit for the sealing liquid in the second compartment adapted to discharge into the tank; and means for introducing sealing liquid into said first compartment.

9. A relief valve for a tank containing volatile liquids, said valve having two compartments each partially filled with sealing liquid; a vent providing communication between the atmosphere and the interior of the first compartment above the sealing liquid; conduit means adapted to communicate with the tank and having an opening below the level of the sealing liquid in said first compartment; an overflow conduit for the sealing liquid in the first compartment discharging into the second compartment; an overflow conduit for the sealing liquid in the second compartment adapted to discharge into the tank; and means for introducing sealing liquid into said first compartment.

10. The combination defined in claim 9, in which said overflow conduits are provided with means for adjusting the height of their tops to obtain any desired predetermined fixed level of the sealing liquid.

11. A relief valve for mounting on the flexible roof of a tank for storing liquid, said valve having two compartments in superposed relation each partially filled with sealing liquid; a vent providing communication between the atmosphere and the interior of the upper compartment above the sealing liquid; conduit means adapted to communicate with the tank and having a downwardly extending portion with an opening below the level of the sealing liquid in said upper compartment; an overflow conduit for the sealing liquid in the upper compartment discharging into the lower compartment below the level of the sealing liquid therein; and an overflow conduit for the sealing liquid in the lower compartment adapted to discharge into the tank, and means for introducing sealing liquid into said upper compartment, said conduit means adapted to communicate with the tank including a tube extending downwardly through said lower compartment and upwardly through the sealing liquid in said upper compartment; a valve in the upper compartment above said tube normally closed to the atmosphere; and means extending through said tube downwardly into the tank and anchored thereto and connecting said valve to said tank for opening last said valve when the flexible roof reaches a predetermined position in its expansion under internal pressure.

12. A safety valve mechanism for closed tanks adapted for storage of volatile fluids whose internal pressure varies through a substantial range, said mechanism comprising a chamber freely vented to the atmosphere and partially filled with sealing liquid, to a predetermined level; an inverted cup-like member fixed with reference to said chamber and having its open end projecting below the surface of said liquid and spaced a slight distance from the bottom of said chamber; means providing free communication between the tank and said cup-like member above the surface of said liquid; and means for continuously maintaining constant said predetermined sealing liquid level and for returning said excess liquid to the tank.

13. A safety valve mechanism for closed tanks adapted for storage of volatile fluids whose internal pressure varies through a substantial range, said mechanism comprising a chamber normally sealed against atmospheric pressure and partially filled to a predetermined level with sealing liquid; a conduit open at one end to the atmosphere, its other end projecting below the surface of said sealing liquid and spaced a slight distance from the bottom of said chamber; means providing free communication between the tank and said chamber above said sealing liquid; and means for continuously maintaining constant said predetermined sealing liquid level and returning excess liquid to the tank.

JAMES O. JACKSON.